United States Patent
Bognar

[19]

[11] Patent Number: 6,121,888
[45] Date of Patent: Sep. 19, 2000

[54] EARTHQUAKE DETECTOR

[76] Inventor: Thomas R. Bognar, 5505 Vickery Ave. East, Tacoma, Wash. 98443

[21] Appl. No.: 09/329,230

[22] Filed: Jun. 10, 1999

[51] Int. Cl.⁷ .................................................. G08B 21/00
[52] U.S. Cl. ......................... 340/690; 340/540; 340/686.1
[58] Field of Search ............................. 340/686.1, 686.2, 340/686.6, 689, 690, 540, 566, 693.9, 693.11, 693.12, 565, 567; 200/61.45 R, 61.48, 61.51

[56] References Cited

U.S. PATENT DOCUMENTS

| | | | |
|---|---|---|---|
| 2,689,341 | 9/1954 | Holst | 340/690 |
| 4,262,289 | 4/1981 | Rivera | 340/690 |
| 4,297,690 | 10/1981 | Baker | 340/690 |
| 4,359,722 | 11/1982 | Valdez et al. | 340/540 |
| 4,484,186 | 11/1984 | Wood et al. | 340/689 |
| 4,689,997 | 9/1987 | Windisch | 73/652 |
| 4,801,793 | 1/1989 | Vaynshteyn | 396/50 |
| 4,945,347 | 7/1990 | Perry | 340/689 |
| 4,978,948 | 12/1990 | Samen | 340/690 |
| 5,418,523 | 5/1995 | Anderson et al. | 340/690 |
| 5,596,183 | 1/1997 | Haley | 200/61.45 R |
| 5,633,463 | 5/1997 | Szasz | 340/690 |
| 5,644,300 | 7/1997 | Lin | 340/690 |
| 5,867,099 | 2/1999 | Keeter | 340/567 |
| 5,929,767 | 7/1999 | Wallick | 340/690 |

FOREIGN PATENT DOCUMENTS 0 161 378 A1   11/1985   European Pat. Off. .

*Primary Examiner*—Daniel J. Wu
*Assistant Examiner*—Van T. Trieu

*Attorney, Agent, or Firm*—Nixon Peabody LLP; Thomas W. Cole; Daniel S. Song

[57] ABSTRACT

An earthquake detector including a sensor, a lamp, an audio alarm, a switch, a power source and an electrical circuit. The electrical circuit connects these components in a manner to allow operation of the earthquake detector in an "activated" mode where the lamp and the audio alarm is operated upon detecting movement of the surface by the sensor or in a "light" mode where only the lamp is operated. The electrical circuit may also connect these components in a manner to allow operation of the earthquake detector in a "distress signal" mode where only the audio alarm is operated. The earthquake detector may also include an adjustable mounting bracket for removability and mounting the earthquake detector on a vertical surface. The sensor may include an electrically conductive conical section and a weighted pendulum attached to an upper surface of the detector by an electrically conductive spring to allow lateral and vertical movement of the weighted pendulum within the conical section. The weighted pendulum may include an electrically conductive portion which is electrically connected to the electrically conductive spring such that movement of the pendulum a predetermined distance causes the electrically conductive portion to contact the conical section thereby triggering the operation of the lamp and the audio alarm. A sensitivity adjustment dial may be provided for adjusting the predetermined distance between the weighted pendulum and the conical section by adjusting a height position of the pendulum.

23 Claims, 3 Drawing Sheets

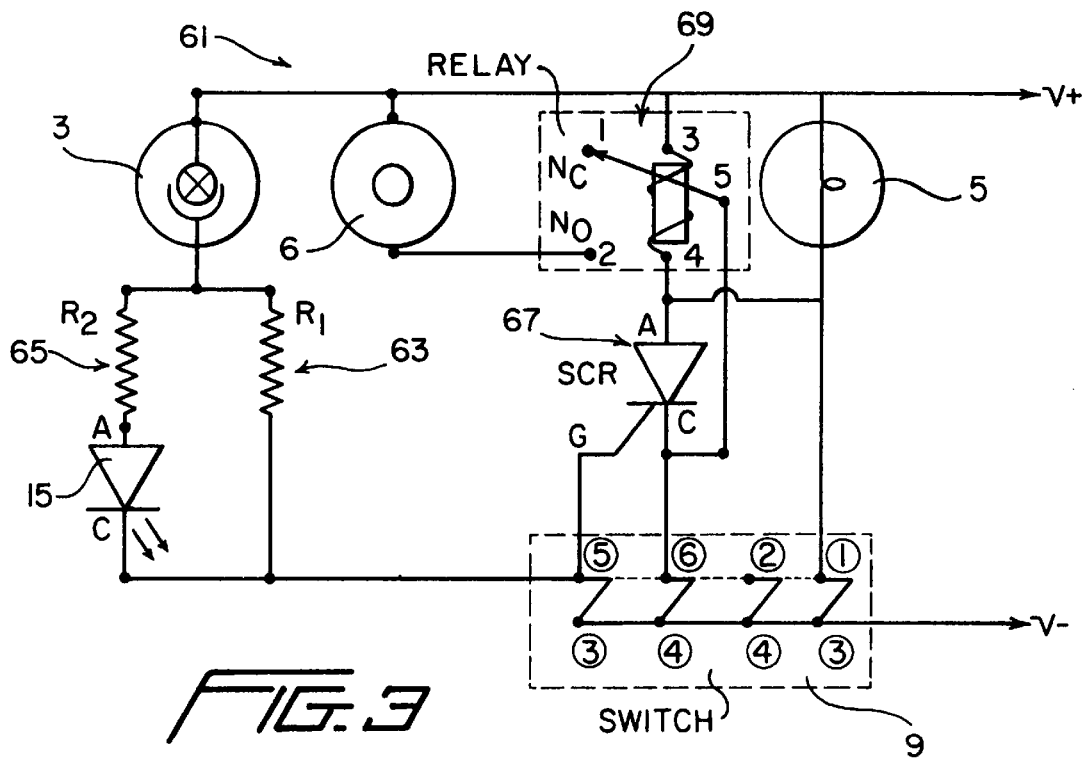
FIG. 3
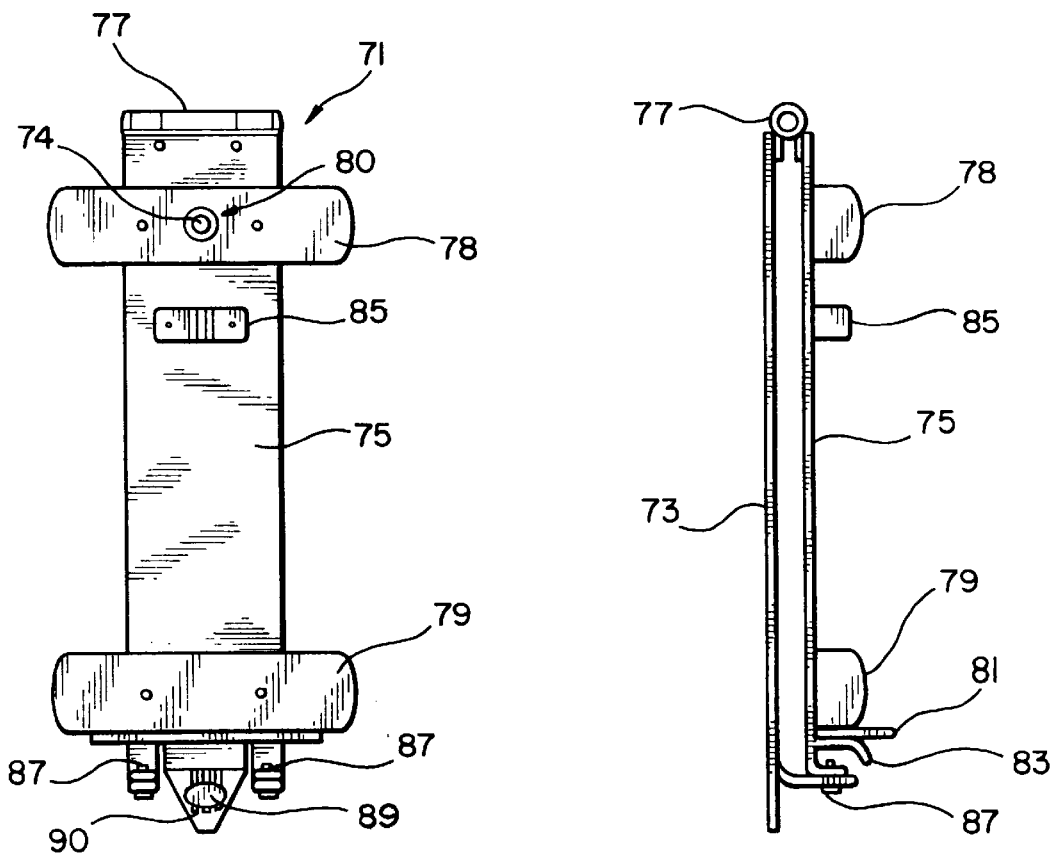
FIG. 4
FIG. 5

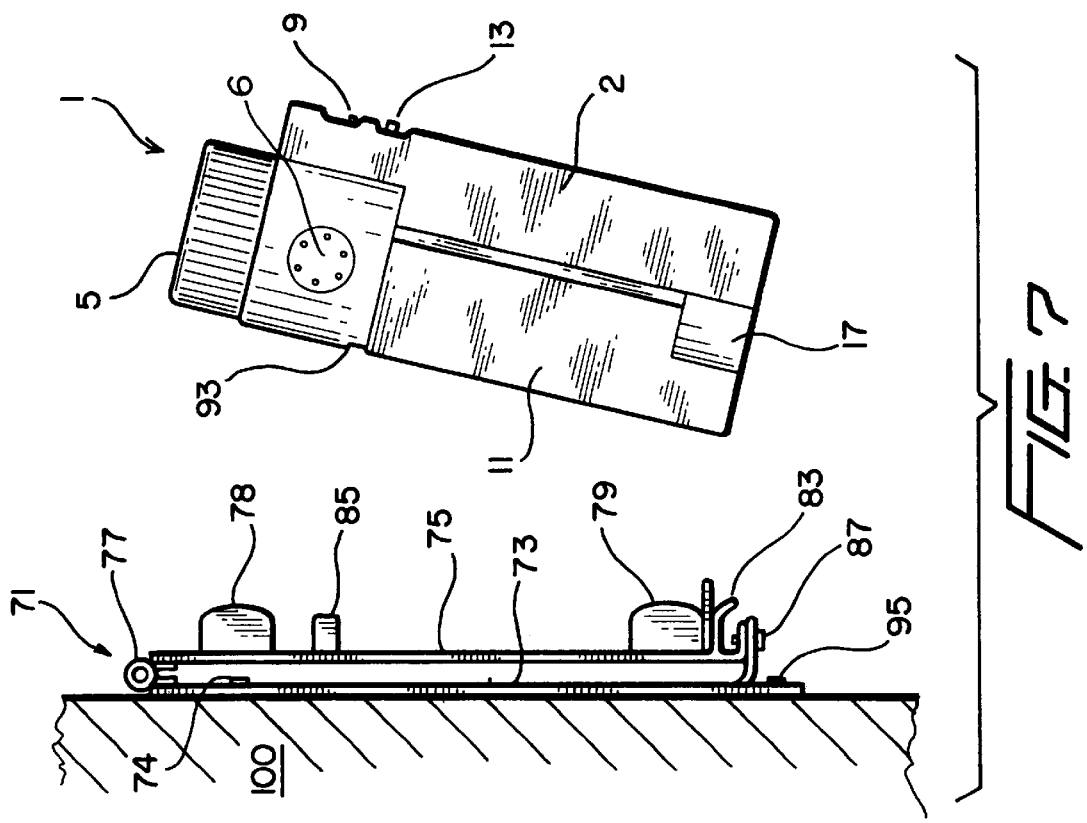
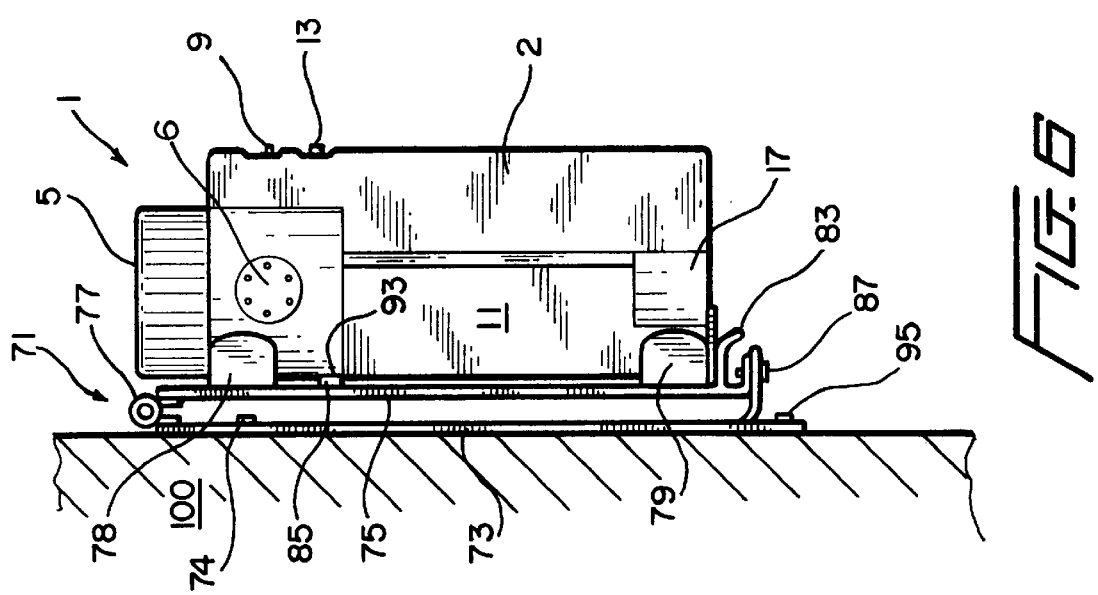

EARTHQUAKE DETECTOR

BACKGROUND OF THE INVENTION

1. Field of the Invention

The present invention is related to the field of seismic activity detectors, or more generally, to earthquake detectors. More specifically, the invention relates to earthquake detectors that provide a light and an audio alarm upon sensing an occurrence of an earthquake.

2. Description of Related Art

Low level seismic activity or earthquakes are constantly occurring over the surface of the earth and generally go unnoticed by most people during its occurrence. However, higher level earthquakes can be readily felt and powerful earthquakes can cause significant destruction to property as well as human injury or death. Geologists and seismologists in general, have not been able to accurately predict the location, magnitude and times of earthquakes. Thus, in most cases, the occurrence of an earthquake is sudden and unexpected. While tremors will last at most for only a few minutes, most of the major destruction, injury and death will occur within ten seconds following the initial impact of the first tremor. As can be expected, earthquakes instill fear and panic in many people because of their known dangers and because they are beyond human control. In this regard, various detectors have been created to provide an alarm when an earthquake is sensed so that people can quickly recognize the occurrence of the earthquake and to escape from harms way such as falling objects, glass, etc. Examples of such detectors are illustrated in U.S. Pat. No. 4,262,289 to Rivera, U.S. Pat. No. 4,297,690 to Baker and U.S. Pat. No. 4,689,997 to Windisch. However, various limitations have been found in such detectors that limit their utility and effectiveness. For instance, many of these detectors use a pendulum to detect the earthquake and to trigger an alarm when the pendulum is swung laterally by the movement of the earth to contact a ring shaped contact. Such simplistic designs have been found to be inadequate however, since there are no provisions made to detect movement of the earth in the vertical direction. Thus, such designs do not provide the level of sensitivity required to quickly and accurately sense the different movements of the earth. The detector in Windisch sought to remedy the lack of sensitivity by providing a motion detector which will detect vertical movement of the earth as well as the lateral movement. Whereas sensitivity was improved, sensitivity adjustment of the detector in Windisch is not possible thereby undermining some of its advantages.

In addition, all these detectors have other limitations which limit their utility and effectiveness. For instance, it is noted that many earthquakes occur during the night when people are asleep. When awaken by the shaking caused by the earthquake, the person is initially confused and does not know why he or she awoke and may go back to sleep. This confusion and state of grogginess can cause potentially hazardous behavior such as walking near glass or other areas of the room in which the person may be injured. Whereas the above discussed alarms provide a loud sound enough to quickly awaken a person in its proximate area and to inform the person the occurrence of earthquake, when such earthquakes occurs at night, the darkness of the surroundings poses additional element of danger to the person. As individuals fully awaken, fear and panic is instilled as they realize that they are in an earthquake and are in danger. However, when confused and in a panic state, it is often difficult for a person to search for a light or lamp switch which will allow them to see in order to escape from harms way without being endangered by falling objects and/or tripping over household items within the room.

To provide illumination in such situations, various detectors have been made that activate an alarm while providing a safety lamp upon detecting an earthquake. Such a detector having an alarm and light is illustrated in U.S. Pat. No. 5,418,523 to Anderson et al. which uses a pendulum and a ring shaped contact to sense lateral movement of the earth. Upon detecting an earthquake, the detector in Anderson provides an alarm and a floodlamp. However, the sensitivity limitations of some of the previously discussed detectors is also present in this detector since it cannot detect the vertical movements of the earth. To increase sensitivity, European Patent No. 161 378 discloses a similar detector in which a pendulum is levered on a spring contact to allow the pendulum to be moved in a vertical direction to detect vertical movement of the earth. Despite these additional features, this detector, as well as the other detectors, have various limitations which limit their utility and effectiveness.

In particular, whereas the detector disclosed in the European Patent No. 161 378 is capable of detecting vertical and lateral movement of the earth during an earthquake and further provides a light as well as an alarm, like the detector in Windisch, the vertical sensitivity is also not adjustable. Moreover, the manufacturing of the detector has been found to be difficult because of the complexity of providing a pendulum which is levered on a spring contact. Because the vertical sensitivity is not adjustable, the spring contact had to be manufactured with high degree of precision to provide just the right amount of spring preload to center the lever in the levered spring contact. This adds to the cost of the earthquake detector while diminishing its reliability.

Moreover, all of the prior art earthquake detectors fail to provide any utility beyond the proximate area at which the detector is mounted. These earthquake detectors are generally fixedly mounted on a wall or another surface and in the case of the detectors with a light, facilitate the evacuation of the room in which the detector is mounted. However, larger earthquakes can cause electrical lines to be damaged thereby rendering lights and lamps within the house as well as those in the neighborhood totally useless. Of course, such power failure can pose additional danger to a person seeking to escape harms way caused by the earthquake. These additional dangers include falling down stairs and being injured by falling objects and debris, etc. The prior art earthquake detecting alarm devices fail to provide any utility and assistance to the user in such cases once the person leaves the proximate area where the detector is mounted.

Therefore, there exists a need for an improved earthquake detector with a light and an alarm feature which will provide aid in the evacuation of the room in which the detector is mounted. There also exists a need for such a detector with heightened sensitivity which can detect vertical movement of the earth in a simple and cost effective manner. There also exists a need for an earthquake detector where the sensitivity of the detector can be easily adjusted. Furthermore, there also exists a need for such a detector which can provide utility and assistance to the user beyond the proximate area where the detector is mounted.

SUMMARY OF THE INVENTION

In view of the foregoing, it is an object of the present invention to provide an improved earthquake detector with a lamp and an audio alarm feature which will provide illumination to aid in the evacuation of the room in which the detector is mounted.

A second object of the present invention is to provide an improved earthquake detector which can detect vertical and lateral movement of the earth in a simple and cost effective manner.

Yet another object of the present invention is to provide an improved earthquake detector where the sensitivity of the detector can be easily adjusted.

Still further, it is an object of the present invention to provide an improved earthquake detector which can provide utility and assistance to the user beyond the proximate area where the detector is mounted.

In accordance with preferred embodiments of the present invention, these objects are obtained by an improved earthquake detector comprising a sensor for detecting movement of a surface, a lamp, an audio alarm, a switch, a power source and an electrical circuit. The electrical circuit connects the sensor, the lamp, the audio alarm, the switch and the power source in a manner to allow operation of the earthquake detector in an "activated" mode where the lamp and the audio alarm is operated upon detecting movement of the surface by the sensor. In addition, the earthquake detector is operable in a "light" mode where only the lamp is operated. In an alternative embodiment, the electrical circuit may also connect these components in a manner to allow operation of the earthquake detector in a "distress signal" mode where only the audio alarm is operated. The earthquake detector may also comprise a mounting bracket for removably mounting the earthquake detector on a vertical surface such as a wall. The mounting bracket may include adjustment screws for adjusting the position of the earthquake detector.

In one embodiment of the present invention, the sensor of the earthquake detector comprises an electrically conductive conical section and a weighted pendulum movably disposed within the conical section. In this embodiment, the weighted pendulum is attached to an upper surface of the detector by an electrically conductive spring and is laterally and vertically movable within the conical section. The weighted pendulum includes an electrically conductive portion such as a serrated disk which is electrically connected to the electrically conductive spring such that movement of the pendulum a predetermined distance causes the electrically conductive portion to contact the conical section. This contact triggers the operation of the lamp and the audio alarm when the earthquake detector is in an "activated" mode. In addition, the predetermined distance between the weighted pendulum and the conical section may be adjustable by adjusting a height position of the pendulum within the conical section. This adjustment which changes both the lateral and vertical contact distance, may be attained by turning a sensitivity adjustment dial which adjusts the height position of the pendulum.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 3 illustrates a schematic of an electrical circuit which may be used to operate the earthquake detector of FIG. 1.

FIG. 4 is a frontal view of a mounting bracket in accordance with one embodiment which may be used to removably mount the earthquake detector of FIG. 1.

FIG. 5 is a side profile view of the mounting bracket of FIG. 4.

FIG. 6 is a side profile view of the earthquake detector of FIG. 1 mounted on a wall using the mounting bracket of FIG. 4.

FIG. 7 is a side profile view of the earthquake detector of FIG. 6 as it is removed from the mounting bracket.

DETAILED DESCRIPTION OF THE PREFERRED EMBODIMENTS

Figure 1:
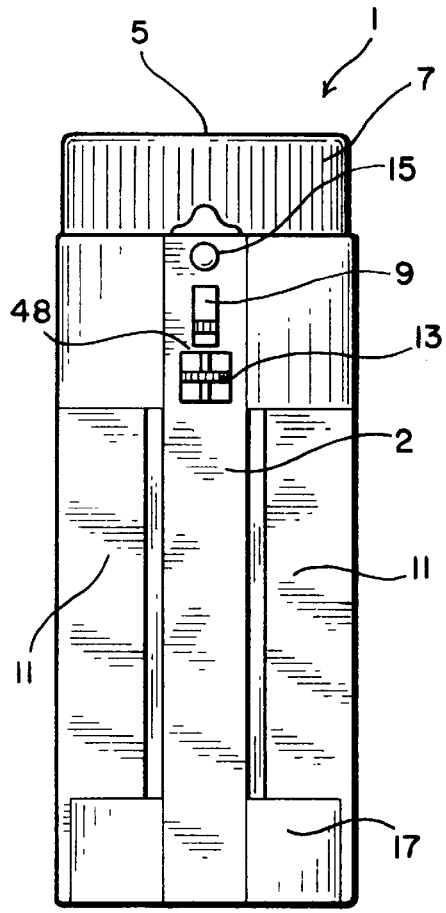
FIG. 1 is a frontal view of an earthquake detector in accordance with one embodiment of the present invention.

FIG. 1 illustrates an earthquake detector in accordance with one embodiment of the present invention that avoids the disadvantages and limitations of the prior art earthquake detectors. It should be noted that whereas the present invention is identified as a earthquake detector, it should be recognized that the earthquake detector may be used in various other contexts where it is desirable to detect movement of a surface. Consequently, the earthquake detector in accordance with the present embodiment may be considered to be a motion detector for detecting movement of a surface. For instance, the present earthquake detector may also be used in the construction and/or mining industries to detect relative movement of a particular structure.

As will be discussed in detail below, the earthquake detector 1 includes a lamp and an audio alarm feature which will provide illumination to aid in the evacuation of the room in which the detector is mounted and to provide clear indication of the occurrence of an earthquake. In addition, the illustrated earthquake detector 1 can detect vertical and lateral movement of the earth in a simple and cost effective manner and its sensitivity can be easily adjusted. Furthermore, as will be made clear in the discussion below, the earthquake detector 1 can provide utility and assistance to the user beyond the proximate area where the earthquake detector 1 is mounted.

As clearly shown in FIGS. 1 through 7, the earthquake detector 1 may include a sensor housing 2 for receiving a sensor 3 (such as one shown in FIG. 3) for detecting movement of a surface such as a wall to which the earthquake detector 1 may be mounted or the earth surface itself. The details of one embodiment of the sensor 3 will be discussed in further detail later. The illustrated embodiment of the earthquake detector 1 includes motion indicators such as a lamp 5 and an audio alarm 6. The lamp 5 provides illumination which can aid a person in evacuating the premises and in avoiding physical harm. In this regard, the illustrated embodiment includes a light distributor 7 for dispersing the light from the lamp 5. However, in other embodiments, the light from the lamp 5 may also be focused by a reflector such as those used in conventional flashlights to provide a focused beam of light. In addition, in alternative embodiments, the lamp 5 may also be hingeably attached or be angled on the earthquake detector 1 such that the light may be directed downwardly toward the floor of the room in which the earthquake detector 1 is mounted. The audio alarm 6 as shown in FIGS. 3, 6 and 7 can provide an audible signal to indicate movement of the surface which is being monitored by the earthquake detector 1. Of course, a power source is required for operating the motion indicators such as the lamp 5 and the audio alarm 6. This power source can be in the form of batteries which may be housed in the battery compartments 11 of the earthquake detector 1. As will be discussed below, the earthquake detector 1 in accordance with the present invention may be used in various operational modes by operating a switch 9 in order to give the earthquake detector 1 maximum utility to the user, even beyond the proximate area where the earthquake detector 1 is mounted. In this regard, the earthquake detector includes an electrical circuit of FIG. 3 that connects the sensor 3, the lamp 5, the audio alarm 6, the switch 9 and the power source such that the earthquake detector 1 may be operated in a manner described below.

In the illustrated embodiment of the present invention, the earthquake detector 1 is made to be portable and may be used in an "Activated" mode where the lamp 5 and the audio alarm 6 is operated upon detecting movement of the surface by the sensor 3 and may also be used in a "Light" mode where only the lamp 5 is operated without the audio alarm 6. In another embodiment, the electrical circuit may also connect these components in a manner to allow operation of the earthquake detector 1 in a "Distress Signal" mode where only the audio alarm 6 is operated without the lamp 5. The significance of these operation modes will be discussed in further detail later in discussing the use of the earthquake detector.

The earthquake detector 1 of the present embodiment may also include provisions for adjusting the sensitivity of the sensor 3 such that the earthquake detector 1 is not activated by very small and minor seismic activity when there is no real danger. In the illustrated embodiment, this adjustment may be attained by turning a sensitivity adjustment dial 13. In this regard, there may also be provided an LED 15 for indicating misalignment of the earthquake detector 1 and for aiding in the alignment procedure which will also be discussed in further detail later. The sensor 3 is supported in the earthquake detector 1 by a housing 17 such that the sensor 3 is securely fixed in the earthquake detector 1.

Figure 2:
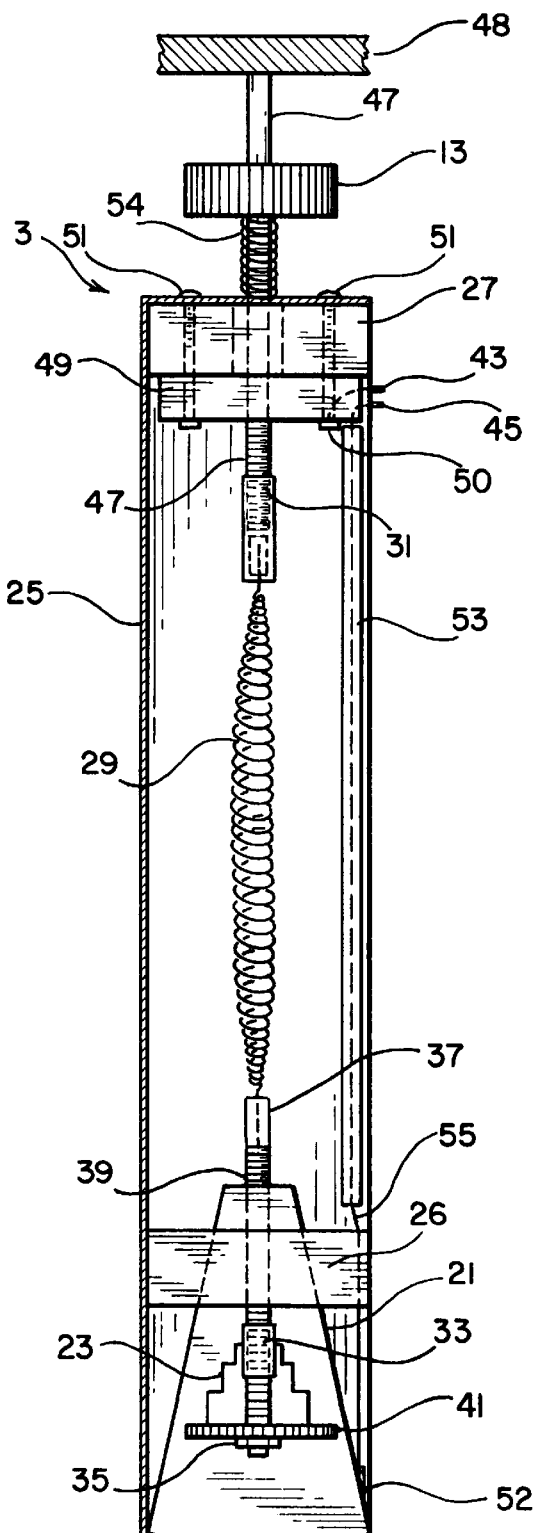
FIG. 2 is a cross-sectional view of a sensor for detecting movement of a surface in accordance with one embodiment of the present invention which may be used in the earthquake detector of FIG. 1.

The detailed structure of the sensor 3 in accordance with one embodiment is more clearly illustrated in FIG. 2. It should be noted that in other embodiments of the present invention, different sensors with different structure than that illustrated in FIG. 2 may also be used. For example, different pendulum designs as well as other motion detecting sensors known in the art may also be used. Consequently, the following detailed description of the sensor 3 should not be construed as limitations on the present invention but only as one example of how the present invention may be practiced.

As clearly shown in FIG. 2, the sensor 3 includes an electrically conductive conical section 21 and a weighted pendulum 23 movably disposed within the conical section 21. The conical section 21 and the weighted pendulum 23 may be positioned within a tubular housing 25 which may be made of plastic such as a clear plastic tube to minimize cost and to allow visual inspection of the various components. The conical section 21 may be positioned within the tubular housing 25 with its cone flared downward by the conical section stay 26 in the manner shown. In the illustrated embodiment, the weighted pendulum 23 is ultimately attached to an upper surface such as a center stay 27 which may be provided either on the sensor 3 as illustrated or alternatively, on the earthquake detector 1. The weighted pendulum 23 is movably disposed to allow vertical and lateral movement within the conical section 21. In this regard, the weighted pendulum 23 may be attached to the center stay 27 by an electrically conductive spring 29. As can be appreciated, by mounting the weighted pendulum 23 with an electrically conductive spring 29, the weighted pendulum 23 can be moved in both vertical and lateral direction depending on the movement of the surface being measured. Of course, various other mechanical components may be provided to support the weighted pendulum within the conical section 21 and to aid in the proper function of the sensor 3. Such mechanical components may include couplers 31 and 33, a nut 35, a metal tube 37 and a shrink tubing 39. It should be recognized that these components are not required to practice the present invention and that other different components known in the general mechanical art may be used to assure that the sensor 3 functions in the desired manner.

The weighted pendulum 23 includes an electrically conductive portion which in the present embodiment may be a serrated disk 41 which is made of non-magnetic metal and is electrically connected to the electrically conductive spring 29. As can be clearly seen in FIG. 2, movement of the weighted pendulum 23 causes the electrically conductive portion such as the serrated disk 41 to contact the conical section 21. In the illustrated embodiment, this contact would trigger the earthquake detector 1 to operate the lamp 5 and/or audio alarm 6 depending on its operational mode. In this regard, electrical contacts 43 and 45 provide a voltage potential between the serrated disk 41 and the conical section 21 such that current would flow when the serrated disk 41 contacts the conical section 21. More particularly, the serrated disk 41 is electrically connected to the electrically conductive spring 29 which is attached at one end to a coupler 31. The coupler 31 is threaded to one end of a threaded shaft 47 which extends outside the tubular housing 25 through a hole in the center stay 27. The coupler 31 and the threaded shaft 47 are electrically conductive and may be made of a metal such as steel or aluminum. The threaded shaft 47 threadingly engages a conductive disk 49 which includes a contact hook up terminal 50 which is connected to the electrical contact 43. The electrical contact 43 may be connected to the electrical circuit of the earthquake detector 1 and serve as either a positive or a negative terminal. The conductive disk 49 is supported and attached to center stay 27 by screws 51. Moreover, the threaded shaft 47 is guided by an integral stay 48 and is rotatable by the sensitivity adjustment dial 13 which allows the sensitivity of the present sensor 3 to be adjusted in a manner discussed later. The shaft compression spring 54 ensures that the threads of the threaded shaft 47 contacts the threads of the conductive disk 49 and also provides resistance to the rotation of the threaded shaft 47.

As can also be seen, the conical section 21 also includes a hook up terminal 52 which is connected to the electrical contact 45 which likewise, may be connected to the electrical circuit of the earthquake detector 1 and serve as either a positive or a negative terminal, depending on the use of electrical contact 45. In this regard, the illustrated embodiment includes a conduit 53 for routing a conductive wire 55 between the hook up terminal 52 and the electrical contact 45. Of course, in alternative embodiments, if the electrical contact 45 is to be provided proximate to the conical section 21, such routing and the conduit 53 would not be necessary. The electrical contact 43 in one embodiment may serve as a positive terminal while the electrical contact 45 may serve as a negative terminal such that when the weighted pendulum 23 is laterally and/or vertically displaced, the serrated disk 41 will contact the conical section 21 allowing current to flow thereby providing a signal to the electrical circuit of the earthquake detector 1 that the surface being monitored is moving and triggering the movement indicator such as the lamp 7 and audio alarm 6.

As can be easily appreciated in the illustrated embodiment of FIG. 2, contact between the electrically conductive portion such as the serrated disk 41 and the conical section 21 which triggers the operation of the lamp 7 and the audio alarm 6 is established when the weighted pendulum 23 is displaced a predetermined lateral and/or vertical distance. This predetermined distance can be easily adjusted by adjusting the height position of the weighted pendulum 23 (i.e. the height position of the serrated disk 41) within the conical section 21. Because of the conical shape of the conical section 21, it can be easily appreciated that in the sensitivity of the sensor 3 can be decreased by lowering the weighted pendulum's 23 height position in the conical section 21 since such lowering of the weighted pendulum 23 would increase the distance between the serrated disk 41 and the conical section 21. Conversely, the sensitivity of the sensor 3 can be increased by raising the weighted pendulum's height position in the conical section 21 since such raising of the weighted pendulum 23 would decrease the distance between the serrated disk 41 and the conical section 21. This height position may be adjusted by turning the sensitivity adjustment dial 13 which turns the threaded shaft 47 in the corresponding manner within the conductive disk 49 to adjust the height position of the weighted pendulum 23. Furthermore, whereas in the illustrated embodiment of the sensor 3, the conical section 21 is positioned with its cone flared downward, in an alternative embodiment, the conical section 21 may also be positioned with its cone flared upward with the weighted pendulum 23 disposed therein. It should be easily appreciated that because of the conical shape, such an alternative positioning of the conical section 21 will provide the same function as in the illustrated embodiment of FIG. 2. However, in this alternative embodiment, the sensitivity would is increased by lowering the weighted pendulum's 23 height position in the conical section and the sensitivity is decreased by raising the weighted pendulum's height position within the conical section. In this manner, the disclosed embodiment of the sensor 3 provides a simple and cost effective sensor design which has heightened sensitivity and is easily adjustable. Moreover, as previously noted, other sensor designs may also be used in the earthquake detector in accordance with the present invention and the sensor designs discussed above are merely provided as examples of a sensor which can be used.

FIG. 3 provides an electrical schematic of one example of an electrical circuit 61 for the earthquake detector 1. Of course, it should be well recognized that the illustrated electrical circuit 61 can be designed in a numerous alternative fashion based on well known principles of circuit design. However, in the present embodiment, the sensor 3, lamp 5, the audio alarm 6 and the switch 9 may be electrically connected by the electrical circuit 61 in the manner shown. The power may be provided to the earthquake detector 1 through the terminals $V_+$ and $V_-$ by batteries (not shown) such as four 1.5V "D" sized batteries which may provided total of 6V to the electrical circuit 61. The lamp 5 may be a 6V lamp such as a Krypton lamp and the audio alarm 6 may be either an electro-mechanical audio alarm or a piezoelectric audio alarm. The electrical circuit 61 also connects the LED 15 and resistors $R_1$ 63 and $R_2$ 65 with the sensor 3 to allow detection of misalignment of the weighted pendulum 23 within the conical section 21 when the earthquake detector 1 is operated in a "SET" mode. The LED may be a 1.75V/20 mA light emitting diode and resistor $R_1$ 63 may be a 1KΩ resistor whereas the resistor $R_2$ 65 may be a 180Ω resistor. The electrical circuit 61 may also include a 2 Amp. silicon controlled rectifier (SCR) 67 for receiving a triggering signal from the sensor 3 and operating the lamp 5 and the audio alarm 6, when in the "activated" operational mode of the earthquake detector 1. In this regard, the switch 9 and a relay 69 such as a 2 Amp. single pole double throw (SPDT) dip switch may be provided to operate the lamp 5 and the audio alarm 6. In this embodiment, the switch 9 having four positions, such as a SP/4T switch, is provided with "Off", "Set", "Activated" and "Light" positions operating the earthquake detector 1 in these various operating modes. In addition, in an alternative embodiment, the switch 9 may be a five position switch or an additional switch may be provided such that the earthquake detector in this alternative embodiment may be used in a "Signal" operating mode where only the audio alarm 6 is operated. Of course, the general operation of the above electrical circuit 61 is evident to one skilled in the art and need not be discussed in further detail here, especially since alternative circuit designs may be used to operate the earthquake detector 1 in accordance with the present invention.

In use, the earthquake detector 1 may be mounted to a wall using a mounting bracket 71 clearly illustrated in FIGS. 4 and 5. The mounting bracket 71 includes an inner bracket plate 73 which may be fixedly attached to a wall or to another vertical surface by an upper mounting screw 74 and also includes an outside bracket plate 75 hingeably mounted to the inner bracket plate 73 by a hinge 77. The outside bracket plate 75 may include an upper cradle arm 78, a lower cradle arm 79, a seat 81, and a support 83 for cradling and supporting the earthquake detector 1. The upper cradle arm 78 may also include an upper mounting hole 80 to allow securement of the upper mounting screw 74 into the wall or the mounting surface. A catch post 85 may also be provided for engaging a catch post receiver (not shown) the earthquake detector 1 and for removably securing the earthquake detector 1 on to the mounting bracket 71.

The mounting bracket 71 is designed to allow proper positioning of the mounted earthquake detector 1 such that the sensor 3 may be properly aligned as will be discussed below. In this regard, the mounting bracket 71 includes adjustment screws 87 which allow the outside bracket plate 75 to be slightly pivoted via the hinge 77 such that the outside bracket plate 75 may be tilted relative to the inner bracket plate 73 and the wall. This allows proper alignment of the sensor 3 even if the wall upon which the mounting bracket 71 is attached is not perfectly vertical such as when there is variation in the wall plumb or other defects are present. Moreover, the mounting bracket 71 also includes a lower mounting slot 89 for receiving a lower mounting screw (not shown). The lower mounting slot 89 includes ribs 90 and is slotted such that the mounting bracket 71 may be rotationally pivoted about the upper mounting screw 74 to allow adjustment of the earthquake detector 1 in a plane parallel to the plane of the wall before being secured on to the wall. Thus, the earthquake detector 1 may be mounted to a wall or another vertical surface using the above discussed mounting bracket 71 which allows adjustments such that the earthquake detector 1 may be mounted in a substantially vertical orientation. Of course, it should be recognized that the earthquake detector 1 may also be used without the mounting bracket 71 by mounting it by another means or by merely placing the earthquake detector 1 in its vertical orientation on a horizontal surface.

Referring now to FIGS. 1 to 7, and in particular, to FIGS. 6 and 7, the operation and use of the earthquake detector 1 in accordance with the present invention is described below. Initially, the mounting bracket 71 (if the bracket is to be used) is mounted on a vertical surface such as the wall 100 as illustrated in FIG. 6. The mounting bracket 71 is mounted on the wall using the upper mounting screw 74. With the switch 9 in the "Off" position and prior to use, the earthquake detector 1 is then mounted on the mounting bracket 71 by engaging the catch post 85 with a catch post receiver 93 on the earthquake detector 1. Then, the sensor 3 of the earthquake detector 1 is adjusted so that the weighted pendulum 23 is substantially axially centered within the conical section 21. This is attained by first ensuring that the sensitivity adjustment dial 13 is in a substantially middle position and having the earthquake detector 1 in a set mode by placing the switch 9 to a "Set" position. If the weighted pendulum 23 is not substantially axially centered within the conical section 21, the LED 15 will be lit to indicate the misalignment if the misalignment is very substantial. Otherwise, the LED 15 will blink according to the amount of misalignment such that LED 15 blinks progressively slower as the correct central alignment is attained. The vertical orientation of the earthquake detector 1 may be adjusted using the adjustment screws 87 and the lower mounting slot 89 in the manner previously described to attained the substantially central positioning of the weighted pendulum 23 within the conical section 21. When the axially centered position is attained, the LED 15 ceases to blink altogether. In this manner, the LED 15 provides guidance as to the positioning of the weighted pendulum relative to the conical section 21. Once the proper substantially central positioning of the weighed pendulum 23 is attained, the lower mounting screw 95 is tightened thereby fixedly mounting the mounting bracket 71 on the wall 100 as clearly shown in FIG. 6. Then the sensitivity of the sensor 3 may be adjusted by turning the sensitivity adjustment dial 13 to adjust the height position of the weighted pendulum 23 within the conical section 21 in the manner described previously.

After all the various adjustments are made with respect to the centering of the weighted pendulum 23 within the conical section 21 and the sensitivity of the sensor 3, the switch 9 is moved to the "Activated" position. When an earthquake occurs, the weighted pendulum 23 is displaced vertically and/or laterally within the conical section 21. Upon being displaced a predetermined distance (as set by the sensitivity adjustment dial 13), the electrically conductive portion such as the serrated disk 41 contacts the conical section 21 thereby triggering the operation of the lamp 5 and the audio alarm 6. As previously noted, the lamp 5 illuminates the proximate area in which the earthquake detector 1 is mounted while the audio alarm 6 clearly indicates the occurrence of the earthquake. The lamp 5 and the audio alarm 6 provide a very significant benefit to the user if the earthquake happens to be at night since the audio alarm 6 will awaken the person and provide illumination so that the person may escape harms way. In this regard, the lamp 5 may also be hingeably attached or angled on the earthquake detector 1 such that the light may be directed outwardly toward the floor of the room in which the earthquake detector 1 is mounted.

In addition, unlike earthquake detectors of the prior art, the earthquake detector 1 in accordance with the illustrated embodiment can provide significant utility and assistance to the user beyond the proximate area where the detector is mounted. This advantage is attained since the earthquake detector 1 in the present embodiment can be removed from the mounting bracket 71 as clearly shown in FIG. 7. As can be seen, by having the mounting bracket separately mounted to the wall 100, the earthquake detector 1 can be used as a light and/or an audio alarm as described below. This feature is especially advantageous when the earthquake occurs at night and/or if there is an electrical power failure such that light fixtures are rendered inoperative. Once the lamp 5 and the audio alarm 6 is triggered by the earthquake, the user can easily remove the earthquake detector 1 from the mounting bracket 71 and position the switch 9 at the "Light" position. This will cause the audio alarm 6 to cease but the lamp 5 will be still lit thereby providing illumination such that the person can escape harms way and avoid any falling objects and obstacles during the escape. Thus, by being removably mounted and fully portable, the earthquake detector 1 in accordance with the present invention provides additional utility and assistance to the user which were not possible in prior art detectors.

In addition, in the case that the user is not able to escape harms way and somehow becomes trapped, the earthquake detector 1 in accordance with the illustrated embodiment can be used to attract attention from a passerby by placing the switch 9 in the "Activated" mode and triggering the audio alarm 6 by tilting the earthquake detector 1 such that the serrated disk 41 contacts the conical section 21. The loud audio alarm 6 acts as an auditory beacon for rescue workers to seek out the trapped person. As previously noted, in an alternative embodiment of the present invention, the earthquake detector may also be provided with a "Distress Signal" operating mode where only the audio alarm 6 is operated without the lamp 5. Such operation may be very important if the rescue effort becomes delayed or protracted such as in the mining industry since by operating only the audio alarm 6, the batteries of the earthquake detector 1 is conserved. This may be attained by providing a fifth position on the switch 9, or more ideally, by providing a normally open push-button single pole single throw (SPST) switch placed between the pole of the power source (such as $V_-$) and the corresponding contact for the audio alarm 6. In such an embodiment, the switch 9 may then be placed in the "Off" mode so as to place the lamp 5 and sensor 3 in an inactive mode and only the audio alarm 6 may be activated. Of course, the audio alarm 6 may be independently activated in other ways and the above embodiments are provided merely as examples of how this may be attained.

From the foregoing, it should now be apparent how the present invention provides an improved earthquake detector 1 with a lamp 5 and an audio alarm 6 which aid in the evacuation of the room in which the detector is mounted. In addition, it can be seen how the present invention provides such a detector with heightened sensitivity which can detect vertical movement of the earth in a simple and cost effective manner. Furthermore, it can now be seen how the present invention provides an earthquake detector where the sensitivity of the detector can be easily adjusted. Moreover, it can also be seen how the present invention provides such a detector which can provide significant utility and assistance to the user beyond the proximate area where the detector is mounted.

While various embodiments in accordance with the present invention have been shown and described, it is understood that the invention is not limited thereto. These embodiments may be changed, modified and further applied by those skilled in the art. For instance, as noted previously, various other sensors may be used instead of the sensor 3 specifically disclosed and discussed above. In addition, the earthquake detector 1 may be used in various other contexts as essentially a motion detector for detecting movement of a surface. Moreover, the earthquake detector 1 need not be used with the mounting bracket 71 and other modifications may be made to the structure and operation of the earthquake detector 1 such as the electrical circuit 61 and the various components of the sensor 3. Therefore, this invention is not limited to the details shown and described previously but also includes all such changes and modifications which are encompassed by the appended claims.

What is claimed is:

1. A portable earthquake detector for detecting seismic activity comprising:

a sensor for detecting movement of a surface;

a lamp for illuminating area proximate to said earthquake detector;

an audio alarm;

a switch;

a power source for providing portable power to said earthquake detector;

an electrical circuit connecting said sensor, said lamp, said audio alarm, said switch and said power source in a manner to allow operation of said earthquake detector in an activated mode where both said lamp and said audio alarm is operated upon detecting movement of the surface by said sensor, in a light mode where only said lamp is operated, and in a distress signal mode where only said audio alarm is operated.

2. An earthquake detector of claim 1, wherein said earthquake detector further comprises a mounting bracket for removably mounting said earthquake detector on a vertical surface.

3. An earthquake detector of claim 2, wherein said mounting bracket includes an adjustment screw for adjusting the position of said earthquake detector.

4. An earthquake detector of claim 1, wherein said sensor comprises an electrically conductive conical section and a weighted pendulum movably disposed within said conical section, where said weighted pendulum is attached to an upper surface of said detector by an electrically conductive spring and is laterally and vertically movable within said conical section.

5. An earthquake detector of claim 4, wherein said weighted pendulum includes an electrically conductive portion which is electrically connected to said electrically conductive spring.

6. An earthquake detector of claim 5, wherein movement of said weighted pendulum a predetermined distance causes said electrically conductive portion to contact said conical section.

7. An earthquake detector of claim 6, wherein said earthquake detector in the activated mode operates said audio alarm and said lamp when said electrically conductive portion contacts said conical section.

8. An earthquake detector of claim 6, wherein said earthquake detector in the lamp mode operates only said lamp.

9. An earthquake detector of claim 6, wherein said earthquake detector in a distress signal mode operates only said audio alarm.

10. An earthquake detector of claim 6, wherein said predetermined distance is adjustable by adjusting a height position of said weighted pendulum within said conical section.

11. An earthquake detector of claim 10, including a sensitivity adjustment dial for adjusting said height position of said pendulum.

12. An earthquake detector of claim 6, further comprising an LED for indicating uncentered alignment of said weighted pendulum within said conical section.

13. An earthquake detector of claim 12, wherein said electrical circuit comprises a plurality of resistors, a relay and a silicon controlled rectifier.

14. A portable motion detector movement of a surface comprising an electrically conductive conical section;

a weighted pendulum movably disposed within said conical section;

a motion indicating means;

a power source; and an electrical circuit connecting said conical section, said electrically conductive portion, said motion indicating means and said power source in a manner that said electrical circuit activates said motion indicating means when said electrically conductive portion contacts said conical section wherein said weighted pendulum includes an electrically conductive portion which is electrically connected to said electrically conductive spring and is attached to an upper surface of said detector by an electrically conductive spring so as to allow lateral and vertical movement within said conical section.

15. A motion detector of claim 14, wherein movement of said weighted pendulum a predetermined distance causes said electrically conductive portion to contact said conical section.

16. A motion detector of claim 15, wherein said predetermined distance is adjustable.

17. A motion detector of claim 16, further comprising a sensitivity adjustment dial for adjusting a height position of said pendulum within said conical section.

18. A motion detector of claim 17, wherein said a motion indicating means comprises at least one of a lamp and an audio alarm.

19. A motion detector of claim 18, wherein said a motion indicating means comprises a lamp and an audio alarm.

20. A motion detector of claim 19, wherein said motion detector is operable in an activated mode where said lamp and said audio alarm is operated when said electrically conductive portion contacts said conical section.

21. A motion detector of claim 20, wherein said motion detector is further operable in a distress signal mode where only said audio alarm is operated.

22. A motion detector of claim 14, further comprising an LED for indicating uncentered alignment of said weighted pendulum within said conical section.

23. A motion detector of claim 22, wherein said electrical circuit includes a multi-position switch, a plurality of resistors, a relay and a silicon controlled rectifier.

* * * * *